(12) United States Patent
Himuro

(10) Patent No.: US 6,705,366 B2
(45) Date of Patent: Mar. 16, 2004

(54) PNEUMATIC TIRE INCLUDING HEADLAND PART

(75) Inventor: Yasuo Himuro, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/784,019

(22) Filed: Feb. 16, 2001

(65) Prior Publication Data
US 2001/0017177 A1 Aug. 30, 2001

(30) Foreign Application Priority Data
Feb. 16, 2000 (JP) .................................. 2000-037716

(51) Int. Cl.$^7$ ................ B60C 11/03; B60C 11/13; B60C 101/00; B60C 103/00; B60C 115/00
(52) U.S. Cl. .................... 152/209.15; 152/209.12; 152/209.28
(58) Field of Search ............. 152/209.15, 209.21, 152/209.28, 209.26

(56) References Cited

U.S. PATENT DOCUMENTS

| | | | |
|---|---|---|---|
| 4,690,189 A | * | 9/1987 | Bradisse et al. |
| 5,386,861 A | * | 2/1995 | Overhoff et al. |
| 5,609,699 A | * | 3/1997 | Himuro |
| 5,658,404 A | * | 8/1997 | Brown et al. |
| 5,707,461 A | * | 1/1998 | Himuro |
| 5,714,021 A | * | 2/1998 | Ochi |
| 6,105,643 A | * | 8/2000 | Rohweder et al. |
| 6,123,129 A | * | 9/2000 | Himuro |
| 2002/0062892 A1 | * | 5/2002 | Himuro |

FOREIGN PATENT DOCUMENTS

| | | | |
|---|---|---|---|
| JP | 2-241805 | * | 9/1990 |
| JP | 5-319025 | * | 12/1993 |
| JP | 9-2024 | * | 1/1997 |
| JP | 11-180114 | * | 7/1999 |
| JP | 2000-247110 | * | 9/2000 |

\* cited by examiner

*Primary Examiner*—Steven D. Maki
(74) *Attorney, Agent, or Firm*—Sughrue Mion, PLLC

(57) ABSTRACT

A pneumatic tire having a directional tread pattern of a designated rotating direction comprises at least one circumferential main groove at a central region of a tread portion, a circumferential sub-groove at each of side regions of the tread portion, a plurality of slant grooves extending in the shape of an unfolded fan and opening at the end of the tread portion, and blocks defined by these grooves, in which a central block located nearest to an equatorial plane of the tire has such a headland part that a corner part facing to the sub-groove at a leading end side in the rotation of the tire taperingly projects into a joint part between the sub-groove and the slant groove, and the headland part has a surface form that a height from a groove bottom of the joint part and a length in the circumferential direction gradually decrease toward the end of the tread portion.

6 Claims, 4 Drawing Sheets

PNEUMATIC TIRE INCLUDING HEADLAND PART

BACKGROUND OF THE INVENTION

1. Field of the Invention

This invention relates to a pneumatic tire and more particularly to a pneumatic radial tire for use in relatively small-size vehicles such as passenger cars, racing cars running on a circuit course and the like designating a rotation direction by a directional tread pattern and having excellent running performances. Especially, the invention relates to a pneumatic radial tire simultaneously and highly establishing a steering stability at wet state inclusive of a resistance to hydroplaning (hereinafter referred to as wet steering performance) and a steering stability at dry state (hereinafter referred to as dry steering performance) while predominantly maintaining other performances such as pattern noise and the like.

2. Description of Related Art

In the conventional high-performance tire having excellent running performances, it is particularly demanded to have an excellent wet steering performance and the following means are applied for satisfying such a demand.

(1) An application of a directional tread pattern as shown in FIG. 4, which is defined by a combination of straight circumferential main grooves 21, 22 and a narrow-width straight circumferential sub-groove 23, notch grooves 24 each extending from the main groove 21 toward a central rib, slant grooves 25 each extending from the main groove 21 and opening to the main groove 22 and slant grooves 26 extending from the main groove 22 and opening to an end TE of a tread portion, wherein the slant grooves 25, 26 are inclined in the shape of an unfolded fan from a position near to an equatorial plane E of the tire toward their opening ends and blocks 27, 28 are defined by these main grooves 21, 22 and slant grooves 25, 26;

(2) An application of means for increasing a negative ratio (ratio of groove area to whole area of a ground contact face) by widening a groove width in at least one of the circumferential grooves 21 to 23, or by increasing the number of the slant grooves 25, 26 arranged or by widening a groove width of the slant groove 25, 26 in order to improve the resistance to hydroplaning in the running on wet road surface;

(3) An application of sharply slant grooves wherein an inclination angle is particularly made small with respect to the equatorial plane E in a central zone of the tread portion different from the gently slant grooves 25, 26 shown in FIG. 4 in order to more facilitate the drainage in lateral direction when water entered into the ground contact face of the tread portion is drained in front-back direction (forward running direction) by the circumferential grooves 21 to 23 and in lateral direction by the slant grooves 25, 26.

On the other hand, the high-performance tire is demanded to have an excellent dry steering performance, so that the following means are applied while improving the wet steering performance.

(4) Means of forming an upheaved bottom portion (platform) in a part of the slant groove 25, 26 from a viewpoint of the requirement for enhancing rigidity of the block 27, 28;

(5) Means of enhancing a lateral rigidity of a shoulder block 28 for improving the steering stability in quick steering as exemplified by the running on the circuit course; and the like.

However, the aforementioned various means cause the following problems from a viewpoint of the wet steering performance and other performances.

(a) As being represented by the circumferential main grooves 21, 22 for draining in the front-back direction and the gently slant grooves 25, 26 or sharply slant groove for draining in the lateral direction, waters flowing from these grooves collide with each other in a joint part between the circumferential main groove and the slant groove having different inclination angles with respect to the equatorial plane E irrespectively of branching or joining of the groove. As a result, the joint part causes disturbance of the water flow to generate bubbles, which considerably degrades the drainage performance and lowers the resistance to hydroplaning.

(b) The upheaved bottom portion applied to the sharply slant groove for enhancing the block rigidity forms a dam against the water flow in the slant groove to degrade the drainage performance. On the other hand, if the upheaved bottom portion is removed, the block rigidity lowers to degrade the steering stability.

(c) When the main groove 22 is located in a ¼ point of the ground contact face or in the vicinity of a position separated from the equatorial plane E by a distance corresponding to ¼ of a developed width of the ground contact face as shown in FIG. 4, the tread portion causes a buckling phenomenon about the main groove 22 during the cornering and hence both the dry and wet steering performances are degraded.

(d) In case of the block defined by the sharply slant grooves having no joint part with the other groove along the way, the ground contacting property is lowered and it is apt to degrade the ride comfort and the resistance to irregular wear.

(e) The increase of the negative ratio produces many problems such as rise of pattern noise level, degradation of the steering stability due to the decrease of block rigidity, occurrence of irregular wear, degradation of wear resistance and the like.

The inventor has already proposed the following pneumatic tire in JP-A-9-2025 in order to simultaneously and advantageously improve the aforementioned wet steering performance inclusive of resistance to hydroplaning, dry steering performance and pattern noise while predominantly maintaining the wear resistance including resistance to irregular wear.

Such a pneumatic tire has a tread pattern wherein a pair of circumferential main grooves are arranged in a central region of a tread portion and a plurality of main slant grooves are extended obliquely from each of the circumferential main grooves toward an end of the tread portion in the same direction with respect to the circumferential main groove and opened to a ground contact end of the tread portion, wherein each of the main slant grooves consists of a sharply slant segment located in the neighborhood portion of the central region and a gently slant segment located in the neighborhood portion of the ground contact end of the tread portion, and an inclination angle of the sharply slant segment with respect to the circumferential direction of the tread portion is 0–30° and an inclination angle of the gently slant segment with respect to the circumferential direction of the tread portion is 70–90°, and a surface height of a tapered end portion of a land part defined by the circumferential main grooves and the main slant groove and located at the side of the central region is smoothly decreased toward the side of the tapered end.

SUMMARY OF THE INVENTION

The invention is concerned with an improvement of the above proposed pneumatic tire and mainly aims at more enhancing the drainage performance during the cornering, and is to provide a pneumatic tire more improving the wet steering performance inclusive of the resistance to hydroplaning together with the dry steering performance under all running modes inclusive of straight running and cornering while predominantly maintaining other performances such as low pattern noise and the like.

According to the invention, there is the provision of a pneumatic tire having a directional tread pattern of a designated rotating direction comprising at least one main groove extending in a circumferential direction at a central region of a tread portion, a sub-groove extending in the circumferential direction at each of side regions of the tread portion sandwiching the central region therebetween, a plurality of slant grooves extending from the main groove through the sub-groove toward an end of the tread portion in the shape of an unfolded fan and opening at the end of the tread portion, and blocks defined by these grooves, in which a central block located nearest to an equatorial plane of the tire has such a headland part that a corner part facing to the sub-groove at a leading end side in the rotation of the tire taperingly projects into a joint part between the sub-groove and the slant groove, and the headland part has a surface form that a height from a groove bottom of the joint part and a length in the circumferential direction gradually decrease toward the end of the tread portion.

In preferable embodiments of the invention, at least a top end portion of the headland part detours the sub-groove in the joint part with the slant groove toward the end of the tread portion, and when the headland part is projected onto a plane perpendicular to the equatorial plane in a direction opposite to the rotating direction of the tire, a surface of the headland part intersecting with an outer wall face of the sub-grooves nearest thereto has a height corresponding to not less than 50% of a groove depth of the sub-groove, and the headland part has a surface of a triangular form.

In another preferable embodiment of the invention, the central block has an end part having an obliquely curved surface of a descending gradient toward a joint part between the slant groove and the main groove.

In the other preferable embodiment of the invention, the central region of the tread portion is provided with a rib continuously extending in the circumferential direction adjacent to the main grooves.

BRIEF DESCRIPTION OF THE DRAWINGS

The invention will be described with reference to the accompanying drawings, wherein.

DETAILED DESCRIPTION OF THE INVENTION

Figure 1:
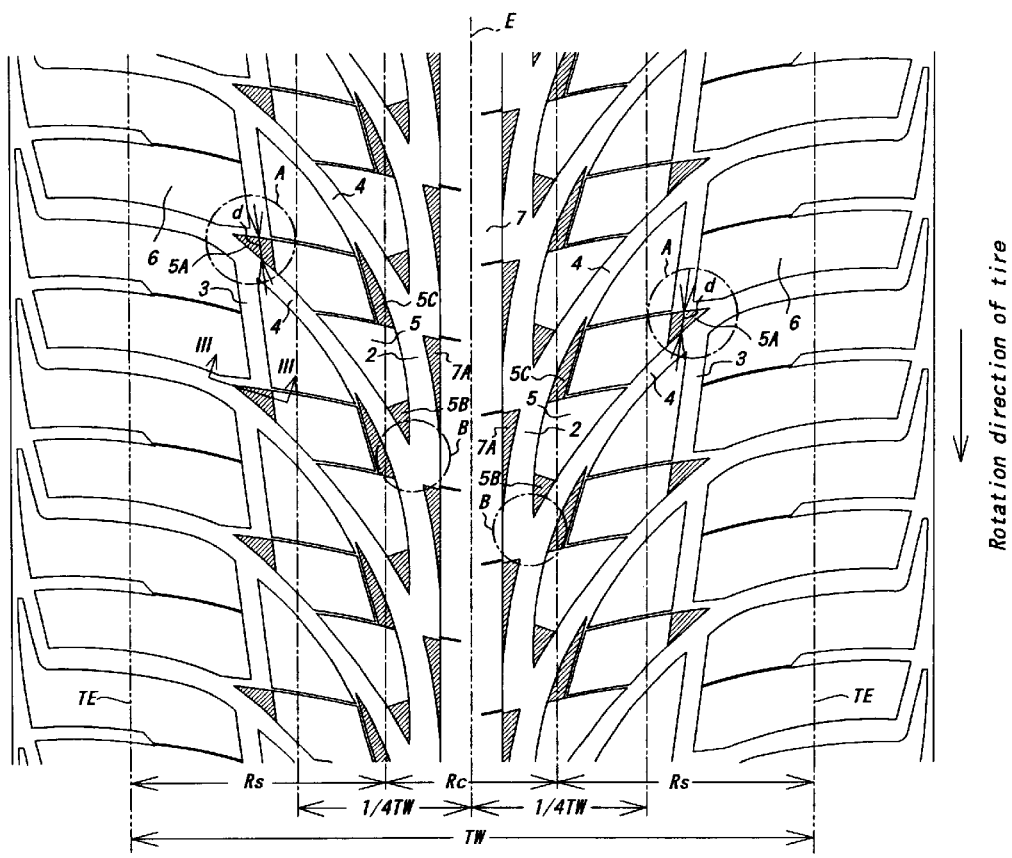
FIG. 1 is a developed view of a tread pattern in an embodiment of the pneumatic tire according to the invention.
Figure 2:
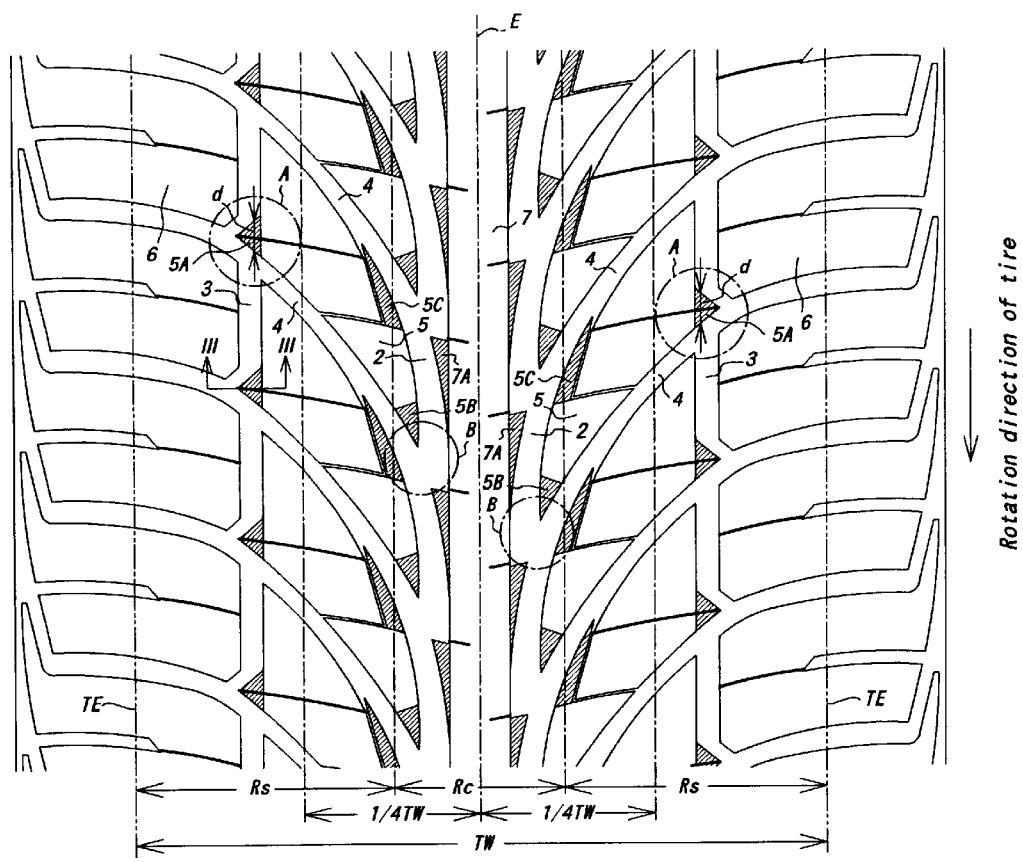
FIG. 2 is a developed view of a tread pattern in another embodiment of the pneumatic tire according to the invention.

In FIGS. 1 and 2, a tread portion 1 of a pneumatic tire is provided in its central region Rc with at least one main groove, two main grooves 2 in the illustrated embodiment extending in a circumferential direction of the tire and in each of its side regions Rs sandwiching the central region Rc with one sub-groove 3 extending in the circumferential direction. The sub-groove 3 has a groove width narrower than that of the main groove 2 and is located in the vicinity of a circumferential line passing through a ¼ point of a ground contact face of the tread portion 1.

The term "central region Rc" used herein means a region ranging from an equatorial plane E of the tire to a position corresponding to ⅛ of a developed width TW of a tread pattern located at both sides of the equatorial plane E. The developed width TW is a distance connecting both ends TE of the tread portion to each other. Further, ¼ point is a position corresponding to ¼ of the width TW. And also, the end TE of the tread portion is a position corresponding to both ends of a ground contact width among terms described in "General Information" of JATMA YEAR BOOK (1999) and is shown by a phantom line. Moreover, an air pressure defined in the measurement of the ground contact width means a maximum air pressure corresponding to a maximum load capacity of a given tire.

And also, the tread portion 1 is provided with a plurality of slant grooves 4 branching from the main groove 2 at each side of the equatorial plane E and extending through the sub-groove 3 toward the end TE of the tread portion in the shape of an unfolded fan. In other words, the slant groove 4 is extended on both sides of the equatorial plane E in a herringbone form with respect to a rotating direction of the tire. Further, the slant groove 4 is opened to the end TE of the tread portion. Moreover, solid lines showing both ends of the developed tread pattern indicate terminal ends of the pattern corresponding to buttress portions of the tread portion 1.

The two main grooves 2, two sub-grooves 3 and plural slant grooves 4 define and form many central blocks 5 in the tread portion 1, and the sub-groove 3 and slant grooves 4 define and form many shoulder blocks 6. In the tire according to the invention, since the rotating direction is designated, each of the blocks 5 and 6 is a slantly arranged block having a leading end part at the ground contact face in the rotating direction of the tire (shown by an arrow) through the slant groove 4 shaped into the unfolded fan.

The central block 5 located nearest to the equatorial plane E of the tire has such a headland part 5A (shown by shadowed zone) that a corner part facing to the sub-groove 3 at the leading end side in the rotation of the tire taperingly projects into a joint part A (shown by a circle) between the sub-groove 3 and the slant groove 4. Moreover, a corner part in a trailing end side of the same central block 5 locates behind the headland part 5A in the rotating direction of the tire.

Figure 3:
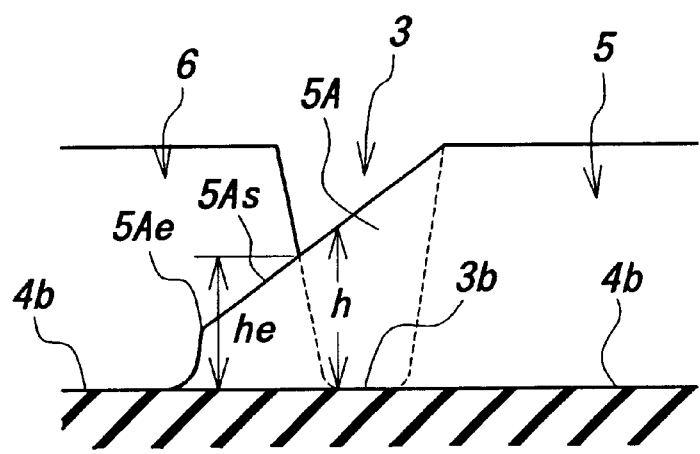
FIG. 3 is a diagrammatically enlarged section view taken along a line III—III in FIGS. 1 and 2.

Referring to FIGS. 1 to 3, the headland part 5A has a surface form 5As that a height h from groove bottoms 3b, 4b of the joint part A between the sub-groove 3 and the slant groove 4 and a length d in the circumferential direction gradually decrease toward the end TE of the tread portion 1.

The tire having the tread pattern of the above structure has the following functions and effects (1)–(5).

(1) The circumferential main groove 2 is arranged in the central region Rc of the tread portion 1 and a plurality of continuous slant grooves 4 branching from the main groove 2 and opening to the end TE of the tread portion 1 are arranged to directionally extend in the shape of the unfolded fan, whereby a streamline of water entered into the ground contact face of the tread portion 1 during the running of the tire under loading overlaps with the arrangement of the main groove 2 and slant groove 4, so that the drainage performance is fundamentally excellent.

(2) However, when a land portion defined only by the slant grooves 4 is a block continuously extending from the position of the main groove 2 up to the end TE of the tread portion 1, uniform ground contacting in such a land portion can not be obtained and hence irregular wear is caused. In order to avoid such a problem, it is favorable that the sub-groove 3 is arranged in the circumferential direction of the tread portion 1 to form the central blocks 5 and the shoulder blocks 6. In this case, when the sub-groove 3 is arranged in the vicinity of the circumferential line passing through the ¼ point, the sufficiently large rigidity of the shoulder block can be obtained, whereby the steering stability in the cornering can significantly be ensured.

(3) As previously mentioned, however, there is caused a problem that waters flowing from the sub-groove 3 and the slant groove 4 collide with each other in the joint part A therebetween accompanied with the arrangement of the sub-groove 3 and the flowing of water is disordered to form bubbles and hence the drainage performance is damaged. Therefore, such a problem can completely be avoided by arranging the headland part 5A taperingly projecting into the joint part A in the central block 5.

That is, water flowing in the slant groove 4 smoothly flows along a wall face of the headland part SA at the leading end side thereof, which is larger than a flowing power of water in the sub-groove 3, so that the water flowing in the slant groove 4 can smoothly be drained from an opening portion at the end TE of the t read portion 1 toward an exterior of the tire without stagnation to largely improve the drainage performance. In other words, the wall face of the headland part 5A located side the slant groove 4 serves as a guide for the water flowing in the slant groove 4.

(4) Furthermore, the headland part 5A has the surface form 5As that the height h gradually decreases toward the end TE of the tread portion 1, so that water flowing under the surface of the central block 5 can smoothly be drained through the headland part 5A into the inside of the groove at the joint part A. And also, the circumferential length d on the surface 5As gradually decreases toward the end TE of the tread portion 1, so that water flowing under the surface of the central block 5 can smoothly be divided into the joint part A and the sub-groove 3 and the slant groove 4 located in the vicinity thereof through the headland part 5A.

If the circumferential length d of the headland part SA is not gradually decreased, it is obliged to largely widen a distance between a leading side end of a shoulder block and a trailing side end of another shoulder block in the joint part A and hence the groove volume in the joint part A is increased to cause an inconvenience of raising a pattern noise level. Even when the circumferential length d of the headland part 5A is gradually decreased or a sharp top end is formed in an extreme case, the height h is gradually decreased, so that the rigidity of the headland part SA is not lowered and the steering stability and resistance to irregular wear are not badly influenced.

(5) Even when the sub-groove 3 is located in the vicinity of the circumferential line passing through the ¼ point, the headland part 5A is projected into the joint part A, so that a bending rigidity of the tread portion 1 in its widthwise direction is increased at the position of the sub-groove 3 and hence the buckling phenomenon of the sub-groove 3 can be suppressed during the cornering of the vehicle. Therefore, the headland part 5A contributes to improve the steering stability in the cornering.

As mentioned above, the tire having the above tread portion 1 improves the drainage performance during not only the straight running but also cornering without aimlessly increasing the groove volume in the tread portion 1, whereby the resistance to hydroplaning can be improved and the sufficient steering stability can be developed. And also, there is no fear of causing the irregular wear, and a low pattern noise level can be attained.

As regards the improvement of the bending rigidity through the sub-groove 3, at least a top end portion of the headland part 5A more actually detours the sub-groove 3 in the joint part A with the slant groove 4 toward the end TE of the tread portion 1. That is, at least the top end portion of the headland part 5A and the sub-groove 3 are arranged so as to overlap with each other in an axial direction of the tire.

And also, when the headland part 5A is actually projected onto a plane perpendicular to the equatorial plane E in a direction opposite to the rotating direction of the tire, it is favorable that a surface 5As of the headland part 5A intersecting with an outer wall face of the sub-grooves 3 nearest thereto has a height he corresponding to not less than 50% of a groove depth of the sub-groove 3. As shown in FIG. 3, the height he is measured from the groove bottom 3b of the sub-groove 3. When the height he is less than 50%, the bending rigidity of the sub-groove 3 can not sufficiently be ensured. The top end 5Ae of the headland part 5A is located in the groove bottom 3b of the sub-groove 3 or is possible to have a height of 0 mm.

Furthermore, the headland part 5A is favorable to have the surface 5As of a triangular form in view of the aforementioned functions and effects.

In addition to the aforementioned headland part 5A, the central block 5 has an end part 5B having an obliquely curved surface of a descending gradient toward a joint part B between the slant groove 4 and the main groove 2 (shown by a shadowed zone). Since the central block 5 has such an end part 5B, water entering into the end part SB is divided into the main groove 2 and the slant groove 4 to decrease the quantity of water entering under the surface of the central block 5, whereby the drainage performance and the resistance to hydroplaning can be improved. And also, the rigidity of the narrow-width end part 5B is increased and hence there is no fear of causing irregular wear.

In order to obtain the same function and effect as mentioned above, a land part SC of a central block 5 located at a trailing side thereof in its approximately middle position ahead an end part 5B of another central block 5 in the rotating direction of the tire is formed to have an obliquely curved surface of a descending gradient toward the slant groove 4 (shown by a shadowed zone). Thus, water entered under the surface of the central block 5 can easily be flowed into the slant groove 4 likewise the above case to decrease the quantity of water under the surface of the central block 5 to thereby improve the resistance to hydroplaning.

Furthermore, the central region Rc of the tread portion 1 is provided with a rib 7 continuously extending in the circumferential direction adjacent to the two main grooves 2. The rib 7 of the illustrated embodiment has an equal width on both sides of the equatorial plane E. In such a rib 7 is provided a headland part 7A taperingly extending toward the main groove 2 so as to have an obliquely curved surface of a descending gradient toward its top end (shown by a shadowed zone). In this way, water entering under the rib 7 is effectively flowed into the inside of the main groove 2, which also contributes to improve the resistance to hydroplaning.

Moreover, it is favorable that the slant groove 4 located in the vicinity of the main groove 2 is a sharply slant segment having an inclination angle of 0–30° with respect to the equatorial plane E and the slant groove 4 located from the sub-groove 3 to the end TE of the tread portion 1 is a gently slant segment having an inclination angle of 70–90° with respect to the equatorial plane E.

The following examples are given in illustration of the invention and are not intended as limitations thereof.

Figure 4:
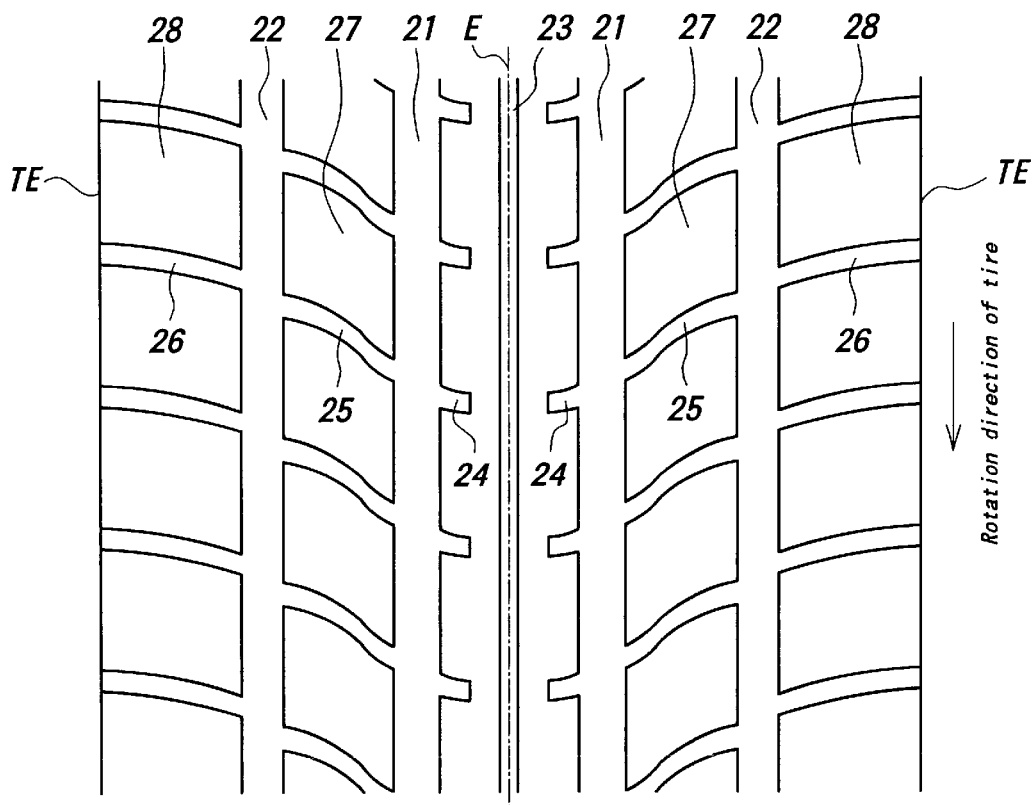
FIG. 4 is a developed view of a tread pattern in the conventional tire.

There are provided three radial tires for passenger car having a tire size of 205/55R16 and a developed width TW of a tread portion 1 of 170 mm. Among them, a tire of Example 1 has a tread pattern shown in FIG. 1, and a tire of Example 2 has a tread pattern shown in FIG. 2, and a tire of Conventional Example has a tread pattern shown in FIG. 4 for evaluating performances in the tires of Examples 1 and 2. Moreover, dimensions of the tread patterns in Examples 1 and 2 and Conventional Example are shown in Tables 1, 2 and 3, respectively. Moreover, an angle in the dimensions of Tables 1 to 3 is an inclination angle of each groove with respect to an equatorial plane E of the tire.

TABLE 1

Example 1

| Dimensions | Width (mm) | Angle (°) | Length (mm) | Depth (mm) | Height (mm) |
|---|---|---|---|---|---|
| Main groove 2 | 8 | 0, groove bottom 10 | — | 8 | — |
| Sub-groove 3 | 4.5 | 7 | — | 6.5 | — |
| Slant groove 4 | 5 | 30–85 | — | 6.5 | — |
| Headland part 5A | 0–8 | — | 9 | — | 1.5–8 |
| End part 5B | 0–5 | — | 10 | — | 0–8 |
| Land part 5C | 0–3.5 | — | 20 | — | 1.5–8 |
| Headland part 7A | 0–4 | — | 25 | — | 0–8 |

TABLE 2

Example 2

| Dimensions | Width (mm) | Angle (°) | Length (mm) | Depth (mm) | Height (mm) |
|---|---|---|---|---|---|
| Main groove 2 | 8 | 0 (groove bottom 10) | — | 8 | — |
| Sub-groove 3 | 4.5 | 7 | — | 6.5 | — |
| Slant groove 4 | 5 | 30–85 | — | 6.5 | — |
| Headland part 5A | 0–12 | — | 6 | — | 1.5–8 |
| End part 5B | 0–5 | — | 10 | — | 0–8 |
| Land part 5C | 0–3.5 | — | 20 | — | 1.5–8 |
| Headland part 7A | 0–4 | — | 25 | — | 0–8 |

TABLE 3

Conventional Example

| Dimensions | Width (mm) | Angle (°) | Depth (mm) |
|---|---|---|---|
| Circumferential main groove 21 | 8 | 0 | 8 |
| Circumferential main groove 22 | 7 | 0 | 8 |
| Circumferential sub-groove 23 | 3 | 0 | 8 |
| Notch groove 24 | 4 | 80 | 6.5 |
| Slant groove 25 | 4.5–5 | 50–70 | 6.5 |
| Slant groove 26 | 5 | 75 | 6.5 |

Each tire of Examples 1 and 2 and Conventional Example is assembled onto a standard rim of 6½JJ among approved rims defined in JATMA YEAR BOOK (1999) and inflated under an internal pressure of 230 kPa and mounted onto each wheel of a passenger car, and then the following four tests are carried out under two crewmen.

(1) Test for hydroplaning performance in the running on a straight road: A limit speed for the occurrence of hydroplaning in the running on a wet road surface having a water depth of 5 mm is evaluated by feeling.

(2) Test for hydroplaning in the running on a curved road: A lateral limit acceleration for the occurrence of hydroplaning is measured in the running on a wet road surface having a turning radius of 80 m and a water depth of 5 mm.

(3) Test for dry steering performance: Feeling evaluation by a test driver in the running on a circuit course of dry state under various sporty running modes.

(4) Test for pattern noise: Feeling evaluation of indoor noise when the car is inertially run from a speed of 100 km/h on a straight smooth road surface.

The test results are shown in Table 4, wherein each performance is represented by an index on the basis that the tire of Conventional Example is 100. The larger the index value, the better the performance.

TABLE 4

| Items | Conventional Example | Example 1 | Example 2 |
|---|---|---|---|
| Hydroplaning performance on straight road | 100 | 120 | 115 |
| Hydroplaning performance on curved road | 100 | 125 | 120 |
| Dry steering performance | 100 | 110 | 110 |
| Pattern noise | 100 | 100 | 100 |

As seen from the results of Table 4, in the tires of Examples 1 and 2, the resistance to hydroplaning in both the straight running and the cornering on the wet road surface having a relatively deep water depth is considerably improved as compared with that of the conventional tire while maintaining the pattern noise at a level equal to that of the conventional tire. Especially, the improving degree in the resistance to hydroplaning in the running on the curved road apt to link to accidents is remarkable as compared with that in the straight running, and also the dry steering performance is improved.

As mentioned above, according to the invention, there can be provided pneumatic tires improving the drainage performance in the straight running and the cornering and the resistance to hydroplaning under any running modes and the steering stability while significantly maintaining various other performances such as pattern noise level, resistance to irregular wear and the like.

What is claimed is:

1. A pneumatic tire having a directional tread pattern of a designated rotating direction comprising at least one main groove extending in a circumferential direction at a central region of a tread portion, a sub-groove extending in the circumferential direction at each of side regions of the tread portion sandwiching the central region therebetween, a plurality of slant grooves extending from the main groove through the sub-groove toward an end of the tread portion in the shape of an unfolded fan and opening at the end of the tread portion, and blocks defined by these grooves, in which a central block located nearest to an equatorial plane of the tire has such a headland part that a corner part of the headland part facing to the sub-groove only at a leading end side in the rotation of the tire taperingly projects into a joint part between the sub-groove and the slant groove, and the headland part has a surface form that a height from a groove bottom of the joint part and a length in the circumferential direction gradually decrease toward the end of the tread portion wherein each slant groove is curved and continuous from the main groove to the end of the tread portion such that water flowing in the slant groove smoothly flows along a wall face of the headland part at the leading side thereof.

2. A pneumatic tire according to claim 1, wherein at least a top end portion of the headland part detours the sub-groove in the joint part with the slant groove toward the end of the tread portion.

3. A pneumatic tire according to claim 1, wherein when the headland part is projected onto a plane perpendicular to the equatorial plane in a direction opposite to the rotating direction of the tire, a surface of the headland part intersecting with an outer wall face of the sub-grooves nearest thereto has a height corresponding to not less than 50% of a groove depth of the sub-groove.

4. A pneumatic tire according to claim 1, wherein the headland part has a surface of a triangular form.

5. A pneumatic tire according to claim 1, wherein the central block has an end part having an obliquely curved surface of a descending gradient toward a joint part between the slant groove and the main groove.

6. A pneumatic tire according to claim 1, wherein the central region of the tread portion is provided with a rib continuously extending in the circumferential direction adjacent to said at least one main groove.

* * * * *